United States Patent
Kim et al.

(10) Patent No.: US 9,941,730 B1
(45) Date of Patent: Apr. 10, 2018

(54) WIRELESS CHARGING STATION

(71) Applicant: Amazon Technologies, Inc., Seattle, WA (US)

(72) Inventors: Daejoung (Dave) Kim, Sunnyvale, CA (US); Adrian Napoles, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 14/839,218

(22) Filed: Aug. 28, 2015

(51) Int. Cl.
*H02J 7/00* (2006.01)
*H02J 7/02* (2016.01)
*H02J 7/04* (2006.01)

(52) U.S. Cl.
CPC ............ *H02J 7/025* (2013.01); *H02J 7/0042* (2013.01); *H02J 7/04* (2013.01)

(58) Field of Classification Search
USPC ........................................................ 320/108
See application file for complete search history.

(56) References Cited

U.S. PATENT DOCUMENTS

| | | | | |
|---|---|---|---|---|
| 2010/0225270 A1* | 9/2010 | Jacobs | .................... | H02J 5/005 320/108 |
| 2011/0254503 A1* | 10/2011 | Widmer | ................ | B60L 11/182 320/108 |
| 2012/0262002 A1* | 10/2012 | Widmer | ............... | H04B 5/0037 307/104 |
| 2015/0091505 A1* | 4/2015 | Hyde | .................. | B60L 11/1848 320/108 |
| 2016/0094939 A1* | 3/2016 | Guy | ........................ | H04W 4/02 455/456.2 |

OTHER PUBLICATIONS

Harrist, "Wireless Battery Charging System Using Radio Frequency Energy Harvesting", BS, University of Pittsburgh, 2001 School of Engineering Master Thesis, 2004, pp. 1-69.
Lipsky, "Wireless Charging Startup Taps RF", EE Times, eetimes. com, Aug. 4, 2014, pp. 1-3.

* cited by examiner

*Primary Examiner* — Mohammed Alam
(74) *Attorney, Agent, or Firm* — Lee & Hayes, PLLC

(57) ABSTRACT

Described herein are example charging stations for wirelessly recharging a variety of mobile devices. In some cases, the charging station is configured to receive a location indication of an antenna within the device, to determine a position of the device within the charging station, and to select an antenna from an array of antennas to provide a recharge signal to the device based on the location indication and the position of the device.

20 Claims, 14 Drawing Sheets

WIRELESS CHARGING STATION

BACKGROUND

The continued proliferation of mobile electronic devices has resulted in a push to design devices that are smaller, lighter, and more power efficient. In particular, some of the major problems facing manufacturers of mobile electronic devices are achieving an effective balance between the size, weight, battery life, recharge cycling and dependability, of the portable electronic device, as well as a rate at which the device may be recharged. For example, the tendency to connect and unconnected a mobile device from a power supply for recharge multiple times a day can often result in wear in tear and/or damage to the connection interface. Therefore, in some cases, the device manufactures have moved to wireless recharging to extend the overall life time of the mobile devices. Unfortunately, most wireless rechargeable devices utilize an inductive system, which necessitates additional hardware, such as an inductive antenna, within the mobile device increasing size and weight and precise placement of the mobile device upon the charging bed.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
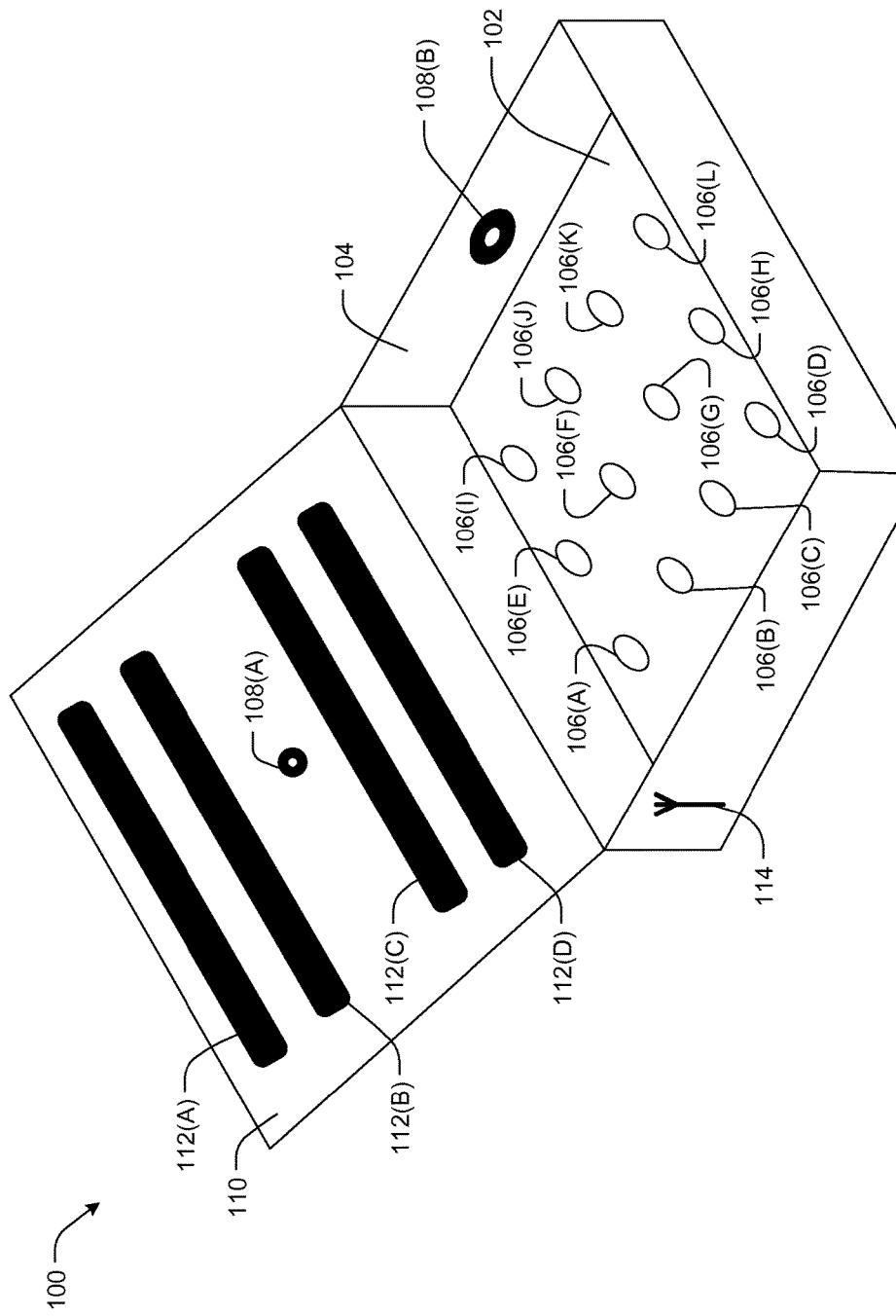
FIG. 1 illustrates an example charging station according to some implementations.

This disclosure describes, in part, electronic devices and stations for charging the electronic devices. In some examples, the station may be configured to charge electronic devices wirelessly, thereby improving the device reliability by eliminating potential damage to the device caused by constant manual coupling and uncoupling of the device and the power supply. For instance, in some devices, one or more of the chagrining pins associated may be damaged due to an incorrect aligned of the charging interface with the power cable.

In some particular examples, this disclosure describes charging stations configured to wirelessly charge a mobile device via existing communication antennas typically incorporated into the mobile electronic devices. For instance, the charging station maybe configure to charge the mobile device via capacitive based antenna systems, such as Bluetooth® antennas, wireless communication antennas, cellular antennas, among others. Thus, by utilizing the communication antennas within the mobile devices to provide wireless recharging capabilities, the overall size and weight of the mobile device may be reduced, as no additional inductive or specialized antenna and/or circuits are designed and incorporated into the devices.

In some implementations, the charging station may include two dimensional arrays of antennas within the charging bed. For example, in some instances, the proximity and/or alignment of the antenna within the device and the antenna within the charging station may affect the overall recharge efficiency. For instance, incorrect placement of an electronic device on a changing station may result in as low as a two percent effective power transfer rate, while correct placement may result in greater than ninety-five percent efficiency. Thus, by including an array of antennas, the charging station may be configured to select one or more of the antennas to facilitate the power transfer to the device at an acceptable level or above a predefined threshold level regardless of the placement of the electronic device upon the charging bed, thereby reducing power loss or waste and overall recharge time.

In some implementations, the charging station may be configured to receive location information from the device when the device is placed within or on the charging station. In some embodiments, the location information may include an indication of the placement of a device antenna relative to the device itself. For example, the device may indicate that the wireless antenna is located at the top left-hand corner of the device. The changing station may include one or more sensors or imagers that are capable of identifying a position of the top left-hand corner of the device in relation to the charging bed. The charging station may select an antenna from the array based upon the position indicated from the sensors or imagers.

In another implementation, the charging station may be configured to receive charging feedback from the electronic device itself. For example, the electronic device may include a circuit for monitoring a recharge rate, while the device is in a recharge state. The charging station may cycle through each of the antennas in the array, while the device collects data on the recharge rate associated with each of the antennas. The device may provide the data to the charging station which may then select, an antenna for the recharge session based on the data. In other implementations, the charging station may be configured to monitor the effective rate of power transfer associated with each of the antennas of the array and to select the most efficient antenna within the array based on the monitoring. It should be understood that, in some cases, the effective rate of transfer is the rate at which the power transmitted by the charging station is actually stored by the receiving device. For example, some of the power transmitted by the changing station may be lost or dissipate during transmission and, thus, not be received by the device. In this manner, the charging station may select the most efficient antenna within the array. Thus, in this implementation, the exact placement of the device within or on the charging bed may no longer be of primary importance.

In some cases, the charging station may be configured with a cover or lid. The cover may also incorporate a second array of antennas which may also be selected for charging the electronic device. For example, some devices include shielding to prevent radiation emanating from the device from traveling in one or more directions, such as into a user's head when speaking on a mobile phone. In some cases, the shielding may hamper the effective recharge rate depending on the orientation of the device within the charging station (e.g., if the device is placed face up or face down). In these cases, by including a second array of antennas in the cover of the charging station, the charging station is able to maintain an effective rate of power transfer regardless of the orientation of the device.

In some implementations, the charging station may include multiple arrays of antennas within the bed or cover. For example, the station may be configured to recharge a variety of electronic devices. In some cases, the electronic device may include a Bluetooth® antenna but not a wireless communication antenna, while other devices may only include a cellular antenna. In these cases, the charging station may include a first array of Bluetooth® antennas, a second array of wireless antennas, and a third array cellular antennas. The charging station may then select both the type of antenna and the location of the antenna to optimize the power transfer efficiency. It should be understood, that various other arrays including various other types of antennas may be incorporated into either the cover, bed, or side walls of the charging station. In some specific cases, the number of a first type of antenna may not directly correspond to the number of a second type of antenna, for instance, when only a few types of devices utilize the second type of antenna.

In addition to including one or more antenna arrays, the cover may also include a display component. For example, the cover may include a notification display to show icons or indications related to notification typically associated with a mobile electronic device. For instance, the notification display may indicate missed calls, text messages, voice messages, pending application updates, social media activity, among others. In other examples, the cover may include a full touch sensitive display that would allow a user to continue to utilize the functionality of the electronic device, while the device is recharging within the station.

FIG. 1 illustrates an example charging station 100 according to some implementations. In general, the charging station 100 includes a bed 102 and a wall portion 104. For instance, the walls 104 may be configured to deflect or scatter any excess radiation associated with providing the wireless power signal to recharge a device. In other instances, the walls 104 may be utilized to retain within the station 100. In the illustrated example, the charging station 100 includes four walls 104 that form a rectangular enclosure. However, it should be understood that in other implementations, the station 100 may have as few as one wall 104, such as when the enclosure is cylindrical in shape, or greater than four, such as when the enclosure is hexagonal in shape.

The bed 102 includes an array of antennas 106 which may be utilized to recharge an electronic device placed within the station 100. In some cases, each of the antennas 106 may be the same type of antenna, such as a Bluetooth® antenna. In other cases, the antennas 106 may be different type of antennas. For example, antennas 106(A), 106(C), 106(E), 106(G), 106(I), and 106(K) may be Bluetooth® antennas, while antennas 106(B), 106(D), 106(F), 106(H), 106(J), and 106(L) may be 902.11 wireless antennas or Wi-Fi antennas. In yet other cases, the antennas 106 may be formed from three or more types of antennas. In some instances, the electronic devices placed within the station 100 may contain metal casing. In these instances, the antennas 106 may be a high frequency antenna, such as those used with wireless communication and described above, such that the power signal is able to penetrate the metal casing unlike other low frequency wireless charging systems.

In the illustrated example, the charging station 100 includes a first sensor 108(A) and a second sensor 108(B). However, in other examples, the charging station 100 may include any number of sensors 1 to N and the sensors 108(A) and 108(B) may be located on any interior surface of the charging station 100. For example, one or more weight sensors, pressure sensors, or capacitive sensors may be located in the bed 102 of the charging station 100 to detect the presence and location of an object resting on the bed 102. In another example, the sensors 108(A) and 108(B) may be proximity sensors, photo sensors, or light sensors which may be activated by an object being placed in the station 100. In other examples, the sensors 108(A) and 108(B) may be a sensor or a camera capable of detecting objects and position/location information associated with objects within the station 100. For instance, the sensors 108(A) and 108(B) may be a camera disposed within the station 100. The camera may be configured to image the interior of the charging station 100 using visible light wavelengths, non-visible light wavelengths, or both. In some cases, the camera may be embodied as a reed-green-blue (RGB) camera. In other cases, the camera may include time of flight (ToF) sensors. In still other cases, the camera may be an RGBZ camera that includes both ToF and RGB sensors.

In the illustrated example, the charging station 100 also includes an option cover 110. In this instance, the cover 110 may be included to contain energy being produced to charge the device and to prevent radiation from the charging station 100 from disrupting other electronic devices within an environment associated with the charging station 100. To further improve the electro-magnetic shielding associate with the charging station 100, the cover 110 may include conductive portions, generally indicated by 112(A)-(D). The conductive portions 112(A)-(D) may be arranged, as illustrated, in rows and/or columns along the cover 100. However, it should be understood that in other examples, the conductive portions 112(A)-(D) may be arranged in other patterns, such as a grid, checkboard, diagonal cross sections, etc.

In some cases, the conductive portions 112(A)-(D) may be formed from a conductive optically clear material, such as a clear polyester substrate. In one example, the clear polyester substrate may be applied to the cover 100 by sputtering process that may provide a uniform substrate contacted to the bottom surface of the cover 110. In the illustrated example, the conductive portions 112(A)-(D) are shown on the cover 110 however, in some examples, the conductive portions 112(A)-(D) may be incorporated into other components of the charging station such as the wall 104 or the bed 102.

In one particular example, the charging station 100 may also include an antenna 114 exposed to the environment for receiving wireless signals (such as calls) directed to the device within the charging station 100. For instance, due to the electromagnetic shielding provided by the conductive portions 112(A)-(D), the device may be unable to receive updates and/or wireless communication via the onboard antennas. Thus, the device may be configured to couple to the antenna 114 in order to receive incoming communications while the device is charging within the station 100.

In one particular example, a user may place a mobile electronic device within the charging station 100. The sensors 108(A) and 108(B) may detect the presence of the mobile electronic device and, in response, the station 100 may establish wireless communication with the mobile electronic device. The mobile electronic device may then provide a type of antenna and a position (for example, based on a predefined scheme) to the charging station 100. In one instance, the position may be one or more values representation a location associated with the specified antenna, such as the top-right hand corner back side of the device. In some instance, the one or more values may also indicate a location of antenna shielding and/or a location from which the antenna is configured to detect wireless signals. In one particular instance, the one or more values may be a numerical value based on a limited of predefined locations on a device, as will be described in more detail with respect to FIGS. 3 and 4.

The sensors 108(A) and 108(B) may image the device and provide the images of the object to an image processing component or module (not shown) incorporated into the station 100. The image processing component may identify the type of mobile device and the location of the antenna with respect to the charging station 100. For instance, the image processing component may determine that the device is placed face up and that the location of the top-right hand corner of the mobile electronic device with respect to the bed 102.

The station 100 may select one of the antennas 106 based on the type provided by the mobile electronic device and on the location of determined by the image processing component. The selected antenna 106 may be chosen from the array of antennas 106(A)-(L) based at least in part on the proximity to the location identified by the image processing component, such that the distance between the selected antenna and the antenna within the mobile electronic device is minimized to, thereby, maximize the power transfer efficiency between station 100 and the device.

In another example, the charging station 100 may receive the notification of the type of antenna from the mobile device. The charging station 100 may then cycle through each of the antenna 106(A)-(L) of the type specified by the device, such that each of the antenna 106(A)-(L) charge the device for a predefined period of time. The device may monitor the rate at which the power signal is received or the amount of power captured over the predefined period of time. The device may provide the rate and/or amount for each antenna 106(A)-(L) back to the charging station 100. The charging station 100 may selected the antenna 106(A)-(L) to use during the remaining recharge period based at least in part on the rate and/or amount. In this manner, the station 100 is able to select the antenna 106(A)-(L) that provided the highest rate of energy transfer or that allowed the device to capture the greatest amount of energy without the use of the sensors 108(A) and (B) nor the image processing components, thereby reducing the overall cost of the charging station 100.

Figure 2:
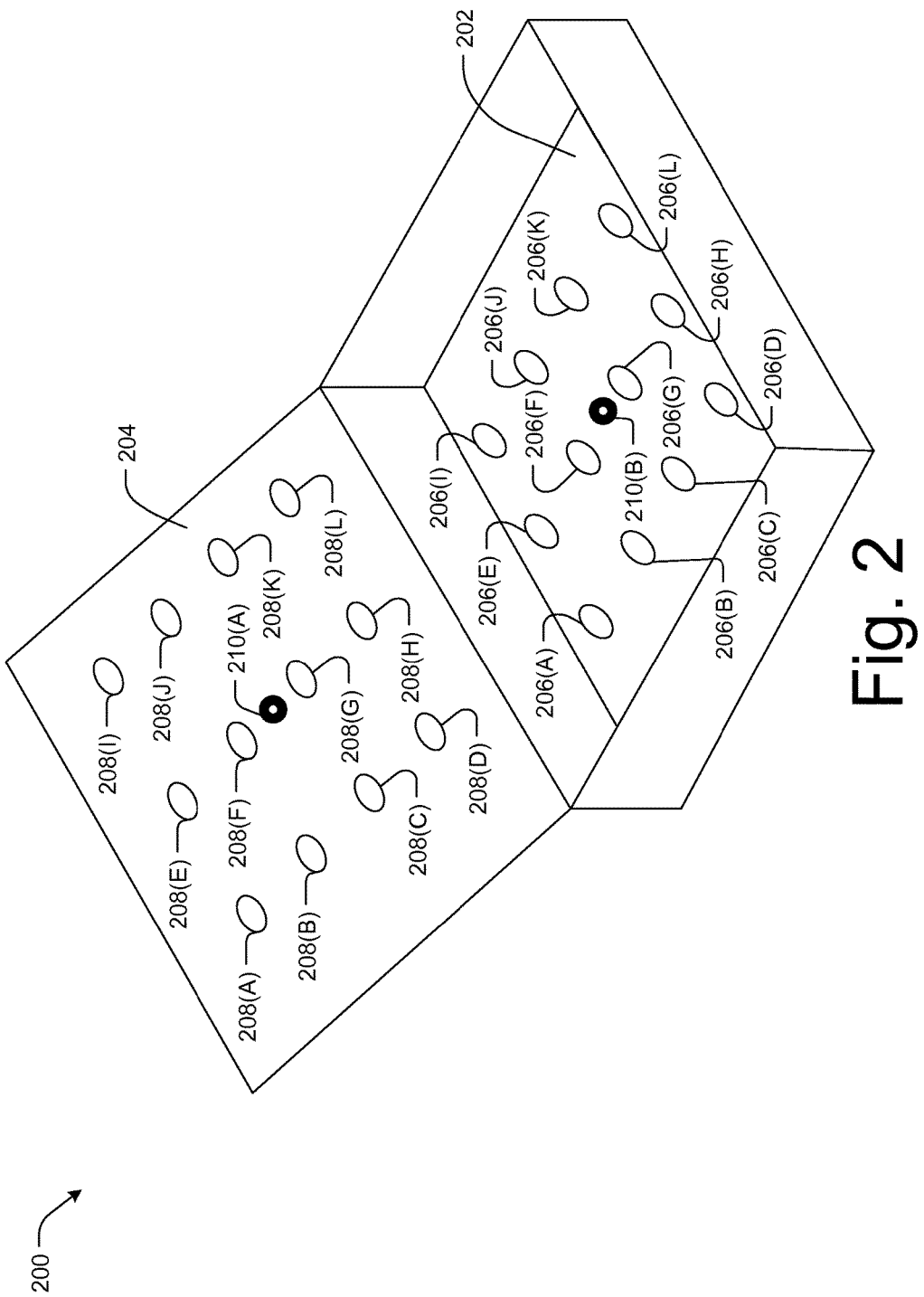
FIG. 2 illustrates another example charging station according to some implementations.

FIG. 2 illustrates another example charging station 200 according to some implementations. In general, the charging station 200 includes a bed 202 and a cover or lid 204. The bed 202 includes an array of antennas 206 which may be utilized to recharge an electronic device placed within the station 200. In some cases, each of the antennas 206 may be the same type of antenna, such as a Bluetooth® antenna. In other cases, the antennas 206 may be different type of antennas. For example, antennas 206(A), 206(C), 206(E), 206(G), 206(I), and 206(K) may be Bluetooth® antennas, while antennas 206(B), 206(D), 206(F), 206(H), 206(J), and 206(L) may be 902.11 wireless antennas. In yet other cases, the antennas 206 may be formed from three or more types of antennas. In some instances, the electronic devices placed within the station 200 may contain metal casing. In these instances, the antennas 206 may be a high frequency antenna, such as those used with wireless communication and described above, such that the power signal is able to penetrate the metal casing unlike other low frequency wireless charging systems.

The cover 204 may also include an array of antennas 208 that may be utilized to recharge an electronic device placed within the station 200. In some cases, some devices include shielding to prevent the user from exposure to radiation from the wireless communication. For instance, mobile phones or smart phones often include shielding on the front side of the device to prevent a user's head from excessive exposure to radiation while the user talks on the phone. Thus, in some implementations, the cover 204 may include the array of antennas 208 to facility charging of the device when, for instance, the device is placed face down on the bed 202. Similar to the array of antennas 206, each of the antennas 208 may be the same type of antenna, such as a Bluetooth® antenna. In other cases, the antennas 208 may be different type of antennas. For example, antennas 208(A), 208(C), 208(E), 208(G), 208(I), and 208(K) may be Bluetooth® antennas, while antennas 208(B), 208(D), 208(F), 208(H), 208(J), and 208(L) may be 902.11 wireless antennas. In yet other cases, the antennas 208 may be formed from three or more types of antennas.

In the illustrated example, the cover 204 includes a first sensor 210(A) and the bed 202 includes a second sensor 210(B). However, in other examples, any number of sensors 1 to N may be located on any interior surface of the charging station 200. In some examples, the sensors 210(A) and 210(B) may be a sensor or a camera capable of detecting objects and position/location information associated with objects within the station 200. For instance, the sensors 210(A) and 210(B) may be cameras disposed within the station 100. The cameras may be configured to image the interior of the charging station 200 using visible light wavelengths, non-visible light wavelengths, or both. In some cases, the camera may be embodied an RGB camera. In other cases, the camera may include ToF sensors. In still other cases, the camera may be an RGBZ camera that includes both ToF and RGB sensors. In some examples, the sensor 210(A) may be an optical sensor while the sensor 210(B) may be a pressure sensor and/or a capacitive sensor capable of detecting an object placed over or on top of the surface or bed 202.

In one particular example, a user may place a mobile electronic device within the charging station 200 and close the cover 204. For instance, by closing the cover 204, any radiation generated by the charging station 200 may be contained and thereby reduce the potential for interfering with wireless communication signals in the proximity of the charging station 200, such as a home wireless network.

Once the cover 204 is closed, the station 200 may establish wireless communication with the mobile electronic device. The mobile electronic device may then provide information associated with a type of antenna and a position (for example, based on a predefined scheme) to the charging station 200. In one instance, the position may be one or more values representation a location associated with the specified antenna, such as the top-right hand corner back side of the device. In some instance, the one or more values may also indicate a location of antenna shielding and/or a location from which the antenna is configured to detect wireless signals. In one particular instance, the one or more values may be a numerical value based on a limited of predefined locations on a device, as will be described in more detail with respect to FIGS. 3 and 4.

The sensors 210(A) and 210(B) may image the device and provide the images of the object to an image processing component or module (not shown) incorporated into the station 200. The image processing component may identify the type of mobile device and the location of the antenna with respect to the charging station 200. For instance, the image processing component may determine that the device is placed face down and that the location of the top-right hand corner of the mobile electronic device with respect to the bed 202.

The station 200 may select one of the antennas 206 or 208 based on the type provided by the mobile electronic device and on the location of determined by the image processing component. The selected antenna may be chosen from the array of antennas 206(A)-(L) or 208(A)-(L) based at least in part on the proximity to the location identified by the image processing component, such that the distance between the selected antenna and the antenna within the mobile electronic device is minimized to, thereby, maximize the power transfer efficiency between station 200 and the device.

In another example, the charging station 200 may then cycle through each of the antenna 206(A)-(L) and 208(A)-(L), such that each of the antenna 206(A)-(L) and 208(A)-(L) charge the device for a predefined period of time. The device may monitor the rate at which the power signal is received or the amount of power captured over the predefined period of time. The device may provide the rate and/or amount for each antenna 206(A)-(L) and 208(A)-(L) back to the charging station 200. The charging station 200 may then selected a particular antenna form the antennas 206(A)-(L) and 208(A)-(L) to use during the remaining recharge period based at least in part on the rate and/or amount. In this manner, the station 200 is able to select the antenna 206(A)-(L) and 208(A)-(L) that provided the highest rate of energy transfer or that allowed the device to capture the greatest amount of energy without the use of the sensors 210(A) and (B) nor the image processing components, thereby reducing the overall cost of the charging station 200.

Figure 3:
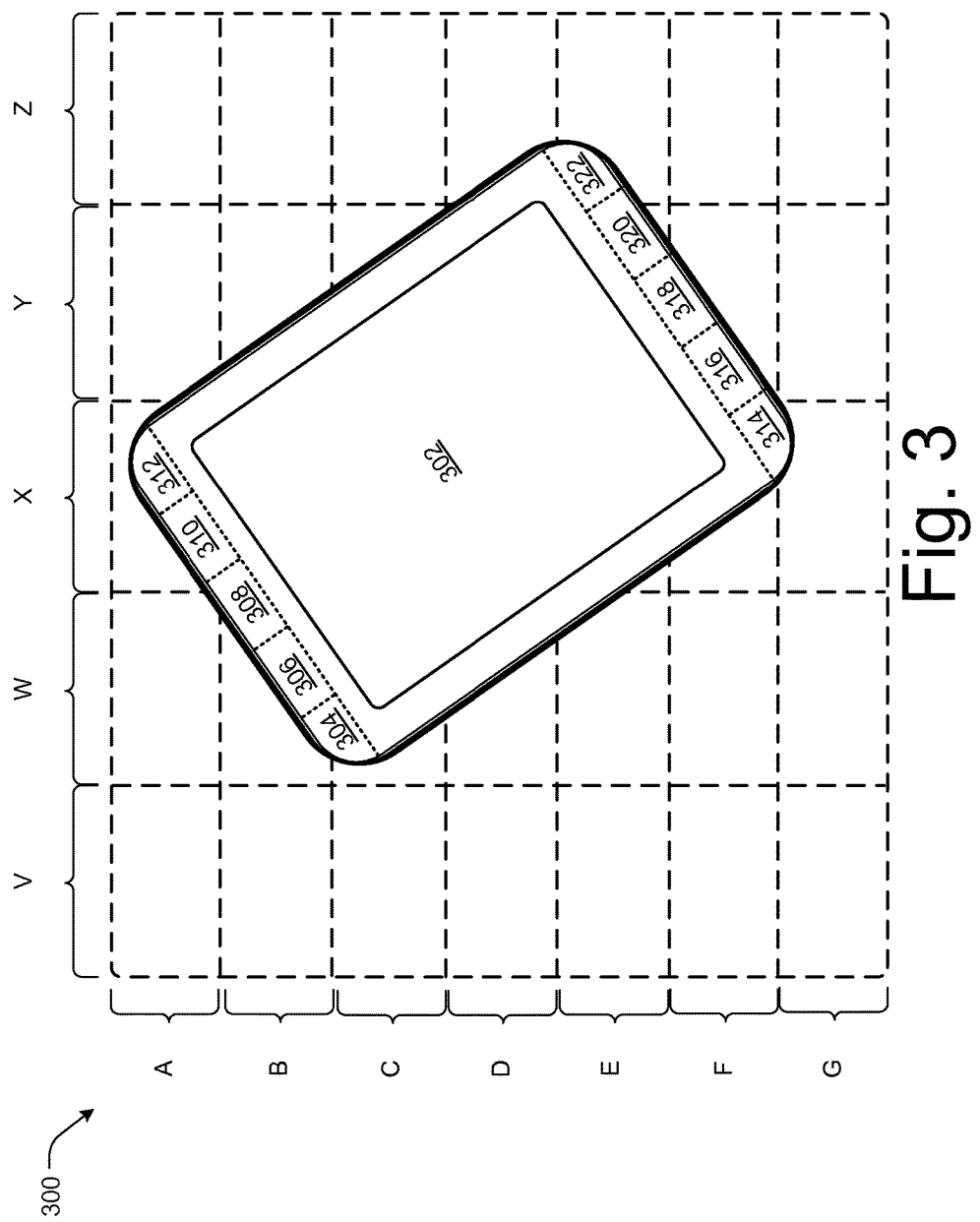
FIG. 3 illustrates an example mobile device resting on a bed of a charging station according to some implementations.

FIG. 3 illustrates an example mobile device 302 resting on a bed 300 of a charging station according to some implementations. The bed 300 may be associated with a charging station, such as charging station 100 of FIG. 1 or charging station 200 of FIG. 2. In the illustrated example, the bed 300 is divided into seven rows (A)-(G) and five columns (V)-(Z), however, in other examples, any number of rows and columns may be utilized. In this example, an antenna may be located at each of the thirty five positions. In some cases, multiple antennas of different types may be located at each of the thirty five positions. Similar, to the bed 300, the device 302 includes ten predefined locations at which an antenna that may be used for charging may be located. For example, in the illustrated example, the device 302 includes locations 304-322 at which an antenna may be located. In some cases, the device 302 may include additional predefined location (not shown), for instance, along the back of the device 302.

In the illustrated example, the device 302 has been placed on the bed 300 with no regard to alignment with a predefined placement requirement associated with the bed 300. In one example, the device 302 may include a 902.11 wireless LAN antenna at location 314 and a Bluetooth® antenna locate at 322. In this example, the device 302 may establish data communication with the charging station via the Bluetooth® antenna and the device 302 may provide an indication that power transfer should take place via the 902.11 antenna at location 314 on the device 302.

Once, the location and antenna information is received by the charging station, the charging station may determine that location 314 is at location (F)(X) of the bed 300. For example, the charging station may utilize one or more sensors, cameras, and/or image processing components to determine the placement of the device 302 on the bed 300 and that the location 314 on the device corresponds to location (F)(X) on the bed 300.

The charging station may enable the 902.11 antenna located at location (F)(X) to charge the device 302. Alternatively, if for example, the device 302 included shielding along the back of the device 302, the charging station may select a 902.11 antenna located in the cover (not shown) at (F)(X).

Figure 4:
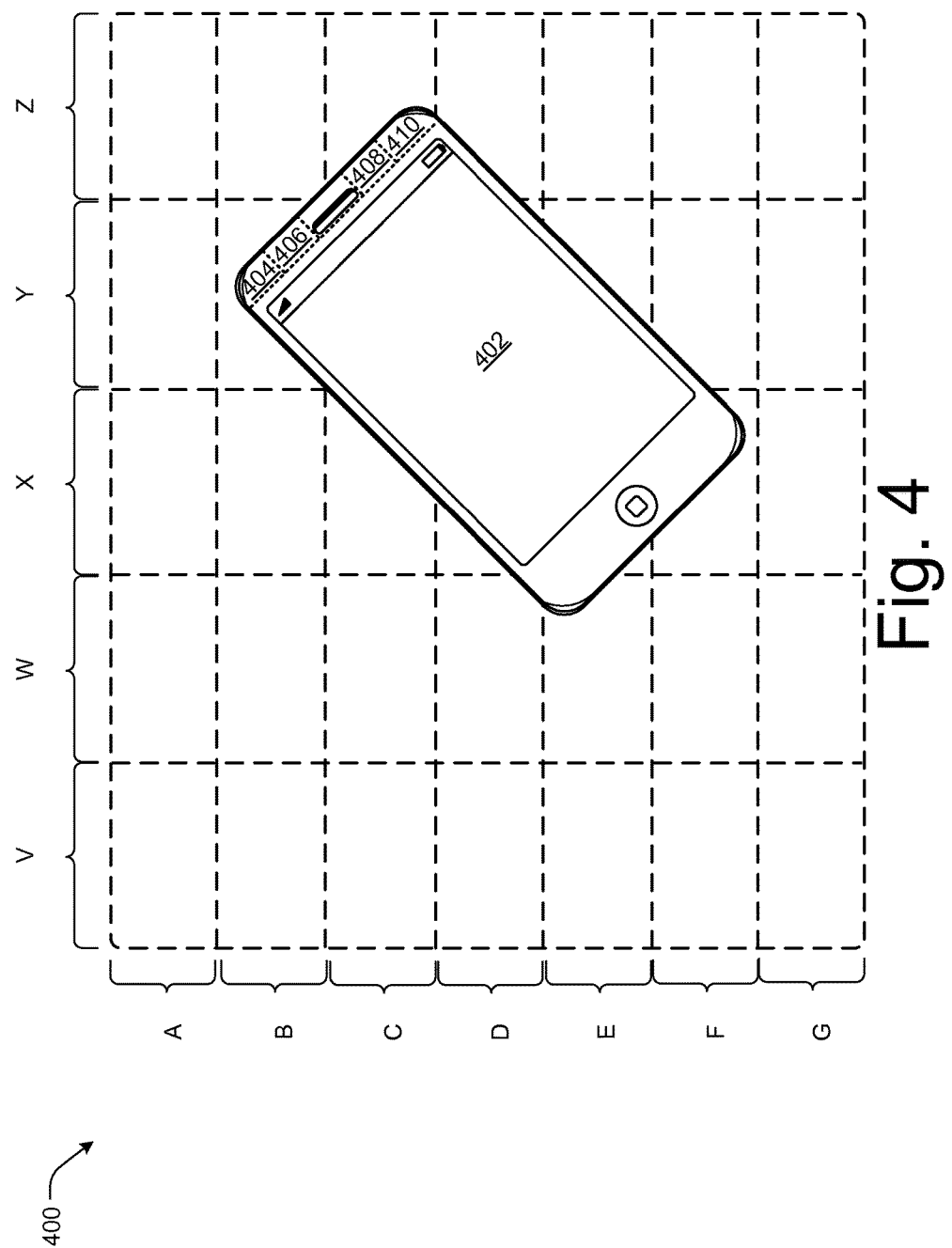
FIG. 4 illustrates another example mobile device resting on a bed of a charging station according to some implementations.

FIG. 4 illustrates another example mobile device 402 resting on a bed 400 of a charging station according to some implementations. Similar to FIG. 3, the bed 300, in the illustrated example, is divided into seven rows (A)-(G) and five columns (V)-(Z). In this example, an antenna may be located at each of the thirty five positions. In some cases, multiple antennas of different types may be located at each of the thirty five positions. In this example, the device 402 differs from device 302 of FIG. 3 and includes ten predefined locations at which an antenna that may be used for charging may be located. For example, in the illustrated example, the device 402 includes locations 404-410 at which an antenna may be located. In some cases, the device 402 may include additional predefined location (not shown), for instance, along the back of the device 402.

In the illustrated example, the device 402 has again been placed on the bed 400 with no regard to alignment with a predefined placement requirement associated with the bed 400. In one example, the device 402 may include a 902.11 wireless local area network (LAN) antenna at location 406 and a Bluetooth® antenna locate at 410. In this example, the device 402 may establish data communication with the charging station via the 902.11 antenna and the device 402 may provide an indication that power transfer should take place via the Bluetooth® antenna at location 410 on the device 402.

Once, the location and antenna information is received by the charging station, the charging station may determine that location 410 is at location (C)(Z) of the bed 400. For example, the charging station may utilize one or more sensors, cameras, and/or image processing components to determine the placement of the device 402 on the bed 400 and that the location 410 on the device corresponds to location (C)(Z) on the bed 400.

The charging station may enable the Bluetooth® antenna located at location (C)(Z) to charge the device 402. Alternatively, if for example, the device 402 included shielding along the back of the device 402, the charging station may select a Bluetooth® antenna located in the cover (not shown) at (C)(Z).

Figure 5:
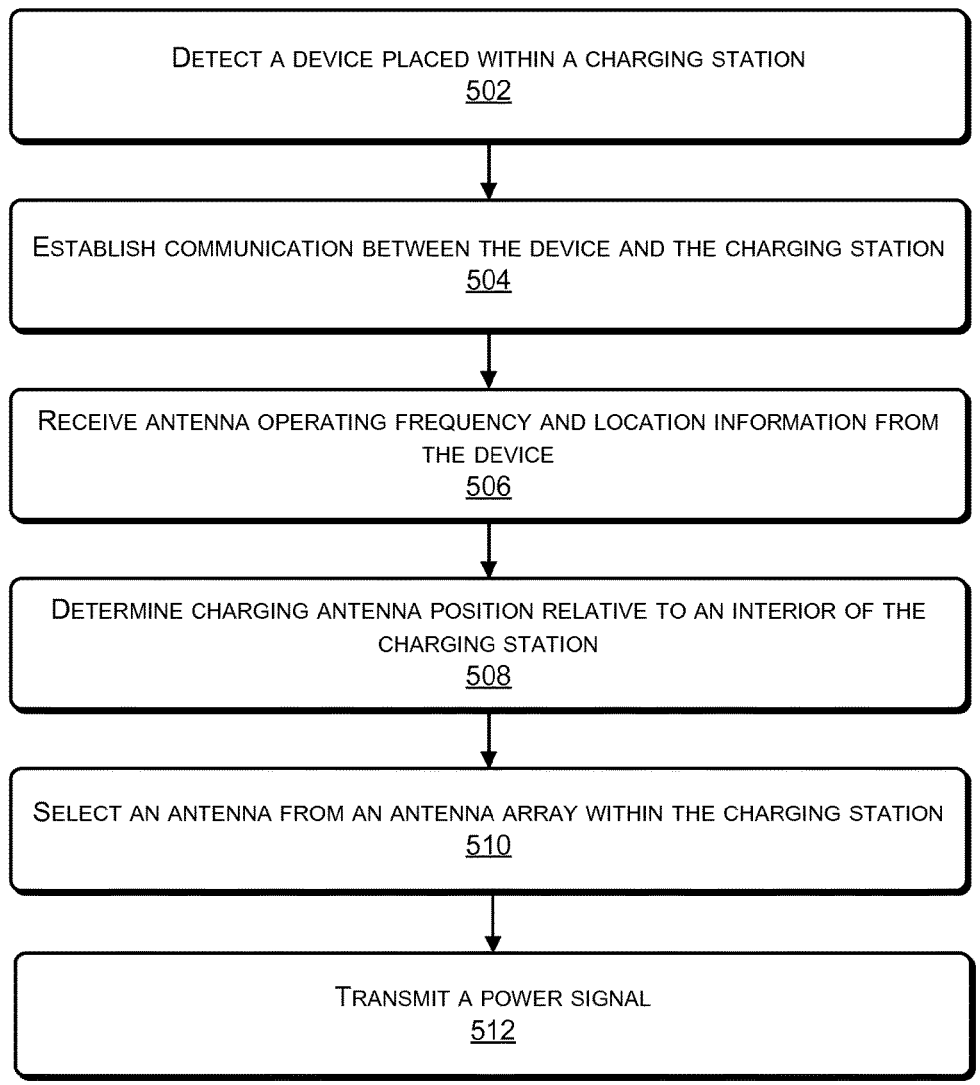
FIG. 5 illustrates an example flow diagram showing an illustrative process for selecting an antenna according to some implementations.
Figure 6:
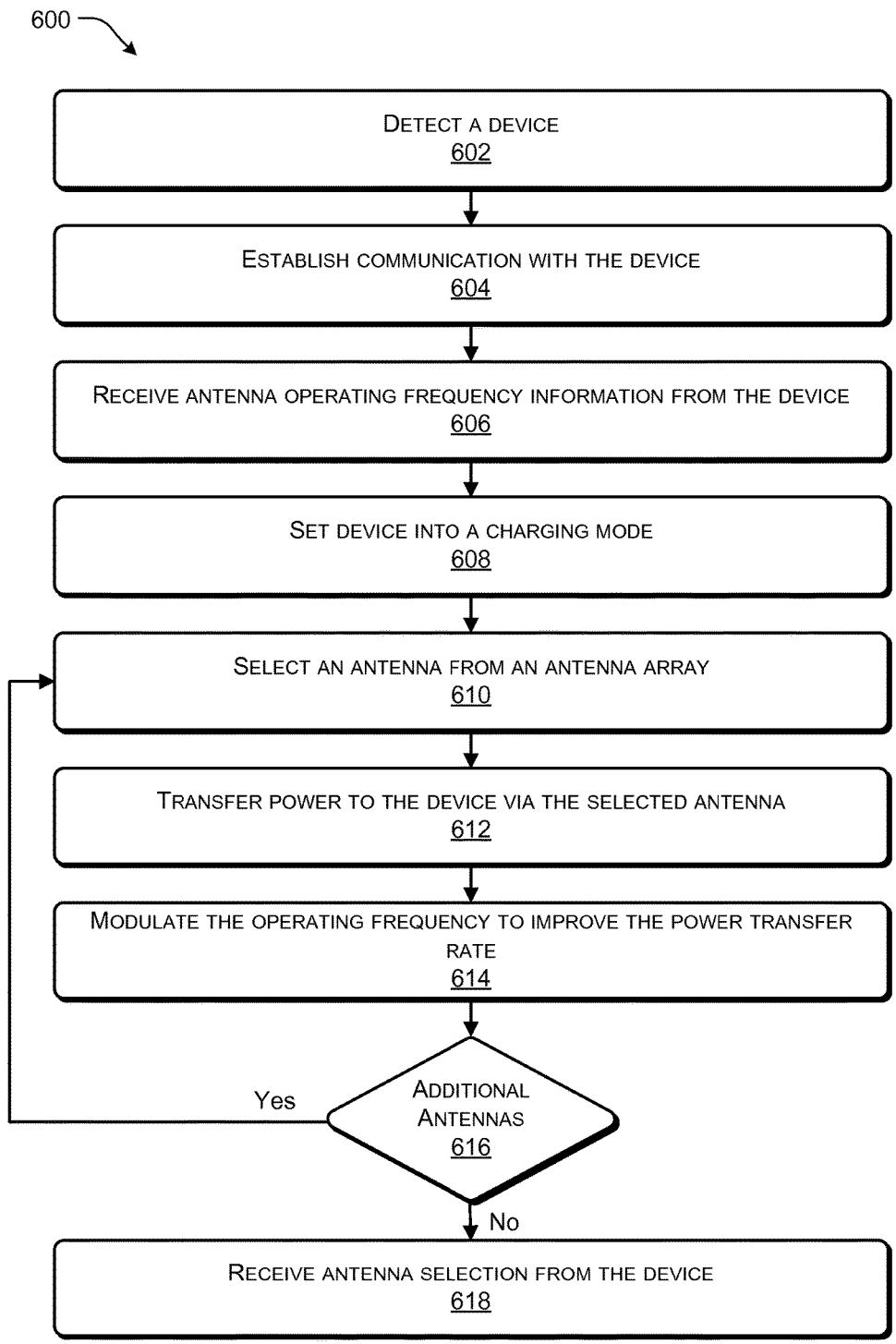
FIG. 6 illustrates another example flow diagram showing an illustrative process for selecting an antenna according to some implementations.
Figure 7:
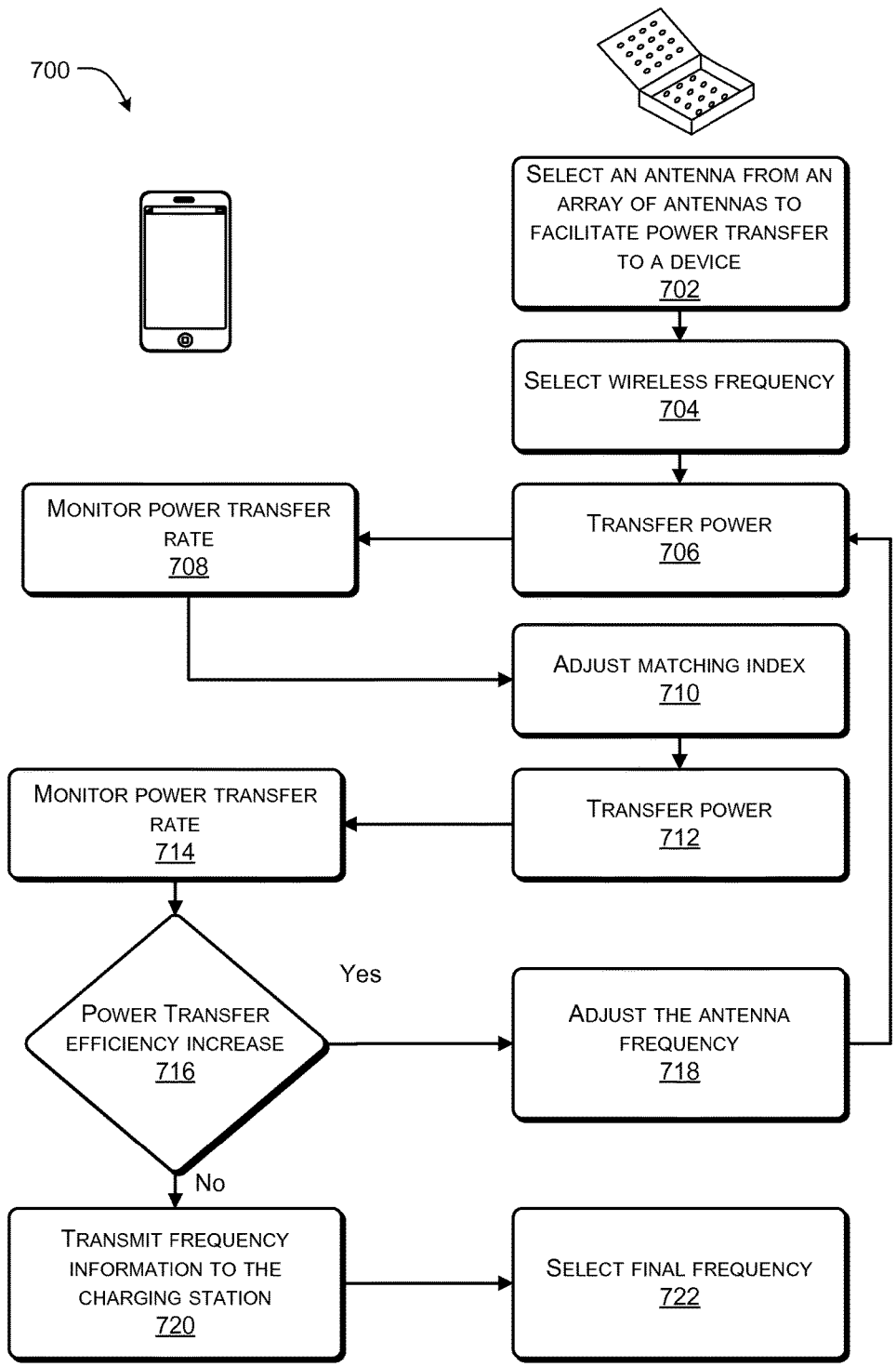
FIG. 7 illustrates an example flow diagram showing an illustrative process for tuning a power transfer frequency according to some implementations.

FIGS. 5-7 are flow diagrams illustrating example processes for selecting an antenna as described above and below. The processes are illustrated as a collection of blocks in a logical flow diagram, which represent a sequence of operations, some or all of which can be implemented in hardware, software or a combination thereof.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 5 illustrates an example flow diagram showing an illustrative process 500 for selecting an antenna according to some implementations. As discussed above, the overall effective rate of power transfer during a wireless recharging session may be directly affected by the proximity and/or orientation/alignment of the device to the antenna within the charging station. For example, device shielding and/or the device's casing material, as well as distance may affect the overall recharge rate of the device.

At 502, the charging station detects a device placed within the charging station. For example, the charging station may include on or more proximity/weight sensors that are able to detect the presence of an object placed on a bed of the charging station. In other examples, the device may establish data communication with the charging station when the device is in proximity to the charging station or vice versa. In some particular examples, the charging station may detect the device when power transfer to the device is established. For instance, the device may periodically activate one or more of the antennas in an attempt to establish power transfer with a device.

At 504, the charging station establishes data communication with the device. For example, the charging station may establish data communication via a first antenna of the antenna array and power transfer via a second antenna of the array. In other examples, the charging station may be establish data communication over a particular wireless protocol via a first type of antenna and then establish power transfer via a second wireless protocol via a second type of antenna.

At 506, the charging station receives device antenna operating frequency (and/or antenna type) and location information form the device via the data communication channel. For example, the charging station may be configured to recharge a variety of devices, each of which may be configured to recharge via a different wireless protocol. Thus, in some implementations, the device may indicate to the charging station a preferred operating frequency, preferred antenna, or wireless protocol for power transfer. In some particular implementations, the device may also provide a list of secondary or optional antennas frequencies or wireless protocols in case the charging station is not equipped with the preferred method.

The device may also provide a location or a position of the charging antenna with respect to the device itself. For instance, the position may be one or more values represen-tation a location on the device associated with an antenna, such as the top-right hand corner back side of the device. In other instances, one or more predefined values may be provided to the charging station to indicate the location or the position of the charging antenna with respect to the device. For example, the device and the charging station may include a predefined scheme in which each value represents a particular position on the device over the various different type of devices that may be recharged by the charging station.

At 508, the charging station determines the charging antenna position relative to the interior of the charging station. For example, once the position or location of the charging antenna relative to the device is known, the charging station may include one or more sensors, imaging components, and/or image processing components that may determine the alignment/orientation of the device with respect to the charging station and, thereby, the position or location of the antenna with respect to charging station.

At 510, the charging stations selects an antenna from the charging stations antenna array to charge the device. For example, the charging station may select the antenna based on the device antenna operating frequency, the device antenna position with respect to the charging station, and the position of the antennas within the antenna array. For example, the charging station may select the antenna with the closest proximity to the device antenna whose power signal would not be disturbed by the device shielding and/or casing.

At 512, the charging station transmits a power signal via the selected antenna. The power signal is then received by the charging antenna within the device and the device battery may, thus be recharged over a period of time. In the illustrated example, a single antenna may be selected to transmit the power signal to the device. However, it should be understood that in other examples, multiple antennas may together transmit the power signal to the device. For instance, the device antenna may be located between two antennas within the arrays such that each antenna may transmit part of the power signal to ensure proper recharge rates by the device. In other cases, beamforming or other multi-antenna signal processes may be used to modulate an amplitude and phase of the power signal over multiple antennas to achieve an optimal effective power transfer rate.

FIG. 6 illustrates another example flow diagram showing an illustrative process 600 for selecting an antenna according to some implementations. Again as discussed above, the overall effective rate of power transfer during a wireless recharging session may be directly affected by the proximity and/or orientation/alignment of the device to the antenna within the charging station. For example, device shielding and/or the device's casing material, as well as distance may affect the overall recharge rate of the device.

At 602, the charging station detects a device. For example, the charging station may include on or more proximity/weight sensors that are able to detect the presence of an object placed on a bed of the charging station. In other examples, the device may establish data communication with the charging station when the device is in proximity to the charging station or vice versa. In some particular examples, the charging station may detect the device when power transfer to the device is established. For instance, the device may periodically activate one or more of the antennas in an attempt to establish power transfer with a device.

At 604, the charging station establishes data communication with the device. For example, the charging station may establish data communication via a first antenna of the antenna array and power transfer via a second antenna of the array. In other examples, the charging station may be establish data communication over a particular wireless protocol via a first type of antenna and then establish power transfer via a second wireless protocol via a second type of antenna.

At 606, the charging station receives an antenna operating frequency (and/or antenna type) information form the device via the data communication channel. For example, the charging station may be configured to recharge a variety of devices, each of which may be configured to recharge via a different wireless protocol. Thus, in some implementations, the device may indicate to the charging station a preferred type of antenna or wireless protocol for power transfer. In some particular implementations, the device may also provide a list of secondary or optional antennas or wireless protocols in case the charging station is not equipped with the preferred method.

At 608, the charging station may provide a signal to the device to cause the device to enter a charging mode. In other examples, the device may enter the charging mode in response to providing the antenna operating frequency to the charging station. In one particular example, the charging mode may cause the device to disable wireless communication via the charging antenna, such that the antenna becomes available for receiving a power signal from the charging station.

At 610, the charging station selects an antenna from the antenna array. In this example, the charging station may cycle through each of the antennas in the antenna array of the corresponding type during the antenna selection process. For example, the charging station may select the first antenna in the array of the type requested by the device. In some cases, if charging station may select an antenna of the antenna type that has not previously been selected.

At 612, the charging station begins to transfer power to the device via the selected antenna. For example, the charging station may be configured to utilize each of the antennas within the antenna array having an antenna type requested by the device for a predefined period of time. In some cases, the period of time may be relatively short (e.g., under a minute) but of sufficient length for the device to monitor and determine an effective rate of power transfer between the charging station and the device.

At 614, the charging station and/or the device monitor the effective rate of power transfer, as described above. The charging station and/or the device then modulates the operating frequency to improve the overall power transfer rate. For example, the device may transmit an effective power transfer rate associated with the current operating frequency, the charging station may adjust the frequency, and the device may transmit the updated effective power transfer rate. The charging station may then select the operating frequency that has a higher effective rate and adjust again until a frequency is selected.

At 616, the charging station determines if additional antennas are available. If so the process 600 returns to 610 and the charging station selects another antenna from the array. If, however, each antenna has previously been selected, the process 600 proceeds to 618. At 618, the charging station receives antenna selection from the device. For example, the device may be configured to monitor the effective power transfer rate and to select an antenna that provided the optimal power transfer. For instance, within the device a bi-directional coupler and/or a processor/circuit may be coupled between the antenna and the power source to monitor the amount of power received and to calculate the effective power transfer rate. The rates may then be stored, in for example, a cache until each of the antennas have been tested and the antenna that provided the greatest power transfer rate is selected. In some cases, the device may transmit the power transfer data back to the charging station and the charging station may select the antenna based on the power transfer data.

FIG. 7 illustrates an example flow diagram showing an illustrative process 700 for tuning a power transfer frequency according to some implementations. In some cases, once a wireless protocol and an antenna is selected, the default frequency associated with the wireless protocol may be tuned to further refine the effective power transfer rate. For example, based on various physical defects and/or variances associated with the device antenna, device circuitry, selected recharge antenna, the charging station circuit, and environmental factors, the default frequency associated with the selected wireless protocol may not result in the highest effective rate of power transfer between the charging station and the device.

At 702, a charging station selects an antenna from an array of antennas to facilitate power transfer to a device. For example, the charging station may select the antenna as described above with respect to FIGS. 5 and 6, by receiving position information and determining a relative location of the device antenna within the charging station or by cycling through the antennas while the device monitors the effective power transfer rate.

At 704, the charging station selects an initial wireless frequency. For example, the charging station may select a default frequency associated with the wireless communication protocol being used to facilitate the power transfer.

At 706, the charging station begins to transfer power to the device via the selected frequency. In some cases, the period of time may be relatively short (e.g., under a minute) but of sufficient length for the device to monitor and determine an effective rate of power transfer between the charging station and the device via the selected frequency.

At 708, the device monitors the effective power transfer rate. For example, the device may be configured with a bi-directional coupler and processor configured between the antenna and the power source to monitor an effective rate of power transfer received at the device's power source.

At 710, the charging station receives the effective power transfer rate from the device and adjusts the matching index of the transmitting antenna to improve the rate of power transfer, such that for the selected frequency the device is receiving a maximized effective power transfer rate.

At 712, the charging station begins to transfer power to the device via the selected frequency after the charging station adjusted the matching index. As described above, in some cases, the period of time may be relatively short (e.g., under a minute) but of sufficient length for the device to monitor and determine an effective rate of power transfer between the charging station and the device via the selected frequency.

At 714, the device again monitors the effective power transfer rate. For example, the device may be configured with a bi-directional coupler and processor configured between the antenna and the power source to monitor an effective rate of power transfer received at the device's power source.

At 716, the device determines if the power transfer efficiency increases over the previously selected frequency. For example, due to environmental and physical variations, the default frequency associated with the selected wireless protocol may be less efficient than a slight modification to the frequency. In the illustrated example, the device is shown making the determination as to the increased power transfer efficiency, however, in other examples, the device may transmit the detected power transfer rate to the charging station which may then determine if another frequency should be selected and tested.

If the power transfer efficiency increased, the process 700 proceeds to 718 and the charging station adjusts the antenna frequency. For example, the charging station may be configured to increase or decrease the frequency by a predetermined number of hertz until the effective rate of power transfer decreases. Thus, in this example, the charging station may add or subtract the frequency by the predetermined number of hertz and return to 706.

If the power transfer efficiency did not increase, the process 700 proceeds to 720 and the device transmits the frequency information to the charging station. For example, the device may send a signal indicating that the previously selected frequency provided a more efficient power transfer rate than the currently selected frequency. In other cases, the device may send the measured power transfer rate for each of the frequencies tested.

At 722, the charging station selects a final frequency to complete the power transfer to the device. For example, the charging station may return to the previously selected frequency as the device determined that the previously selected frequency achieved the most efficient power transfer rate.

Figure 8:
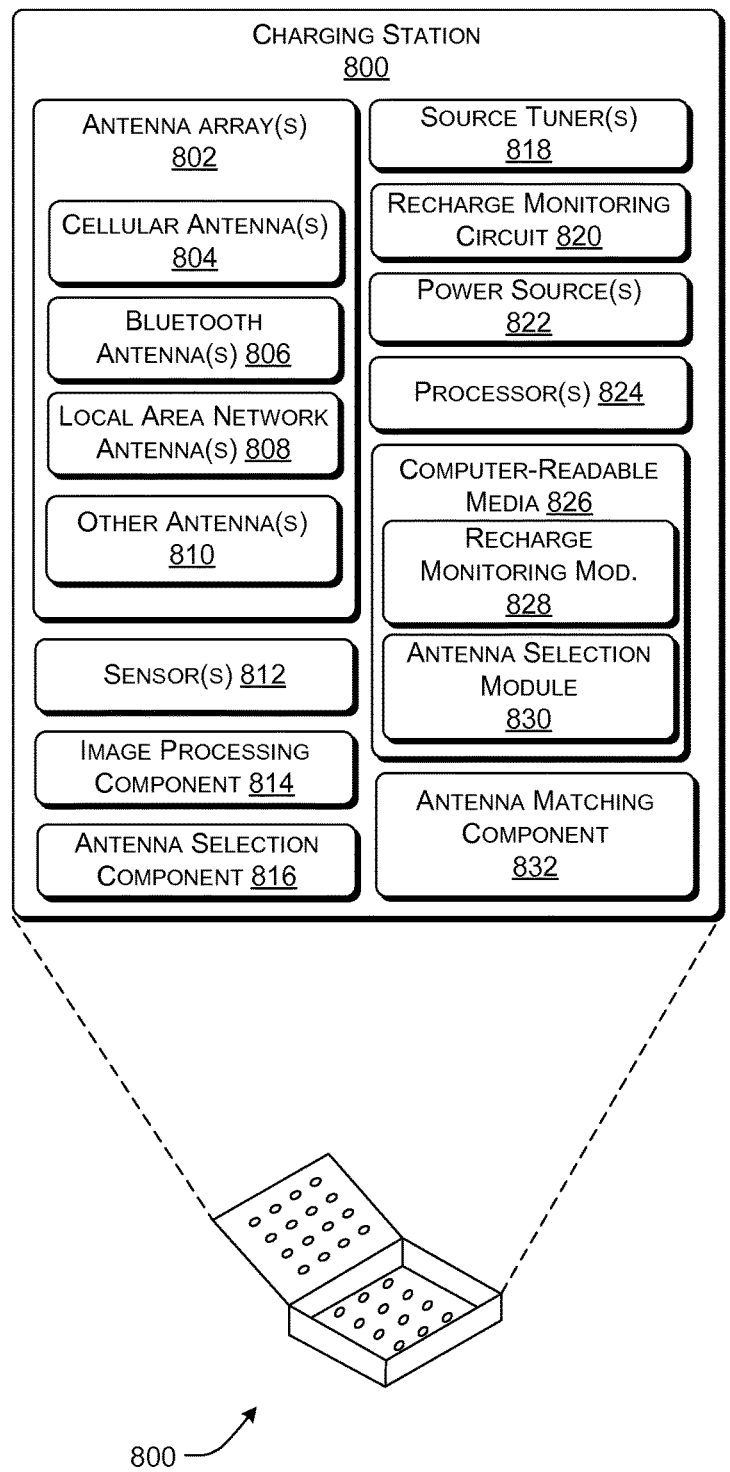
FIG. 8 illustrates an example charging station according to some implementations.

FIG. 8 illustrates an example charging station 800 according to some implementations. In the illustrated example, charging station 800 includes an antenna array 802 for recharging one or more devices placed within or on the charging station 800. The antenna arrays 802 may include multiple antennas arranged in a grid or pattern on a bed or bottom portion of the charging station 800, as well as additional antenna arrays 802 located within a cover or side walls of the charging station 800. In some cases, one or more of the antenna arrays 802 may include various type of antenna, such as cellular antennas 804, Bluetooth® antennas 806, local area network antennas 808, as well as other types of antennas 810.

The charging station 800 may also include one or more sensors 812 for detecting the presence of an electronic device within the charging station 800 or on the charging station 800 and/or the position of the electronic device with respect to the charging station 800. For example, the sensors 812 may include a pressure sensor within the bed of the charging station 800 to detect the placement of a device on the charging station 800. In other example, the sensors 812 may include one or more imaging device capable of capturing image data that may be processed to identify placement of a device, type of device, characteristics of the devices, and/or location of specific features of the device relative to the charging station, among others.

The charging station 800 may include an image processing component 814 for receiving the data captured by the sensors 812 and analyzing the data to identify an orientation, position, arrangement, or location of the device relative to the charging station 800. In some case, the image processing component 814 may be configured to determine an orientation, position, arrangement, or location of an antenna associated with the device relative to the charging station 800. For instance, if the device notified the charging station 800 that the antenna was in the upper-front-left hand corner, the image processing component 814 may identify from the data orientation, position, arrangement, or location of the upper-front-left hand corner of the device relative to the charging station 800.

In some examples, the charging station 800 may include an antenna selection component 816. The antenna selection component 816 may be configured to select or identify a particular antenna form the antenna arrays 802 based at least in part on the orientation, position, arrangement, or location identified by the image processing component 814. For example, the antenna selection component 816 may select an antenna form the array 802 based on a proximity between the location of the device or device antenna relative to each of the antennas within the array 802.

In some examples, the charging station may be configured to tune or adjust the power transfer frequency from an initial or default frequency to improve the overall power transfer rate. In these examples, the charging station 800 may include one or more source tuners 818 and/or one or more antenna matching components 832 coupled to one or more of the antennas of the antenna arrays 802 for adjusting the frequency and matching networks associated with the power transfer signal and/or the transmitting antenna, based on various conditions present during the recharge cycle, as described above with respect to FIG. 7.

The charging station 800 may also include one or more recharge monitoring circuits 820. For example, the recharge monitoring circuits 820 may be coupled to one or more of the antennas of the antenna arrays 802 to determine an effective rate of power transfer associated with the transmitting antenna. In some cases, the recharge monitoring circuits 820 may provide feedback to other components of the charging station 800 to assist in selecting an antenna from the antenna arrays 802 for use during a particular recharge cycle.

The charging station 800 may also include one or more power sources 822 for providing power recharge devices and one or more communication interfaces 824 in addition to the antenna arrays 802, for example, to receiving data and/or information from a device being charged.

The charging station 800 also includes one or more processors 824 and computer-readable media 826. Depending on the configuration of the charging station 800, the computer-readable media 826 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 824.

The computer-readable media 826 may be used to store any number of functional components that are executable on the processors 824. Thus, the computer-readable media 826 may include an operating system and a storage database to one or more modules or applications. For instance, in the illustrated example, the computer-readable media 826 may include a recharge monitoring module 828 to determine an effective rate of power transfer associated with the transmitting antenna. The computer-readable media 826 may include an antenna selection module 830 to analyze effective power rate transfer information either received form a device being recharged, the recharge monitor in circuit 820, or the recharge monitoring module 828 and to select an antenna to transmit the power signal during the recharge cycle.

Figure 9:
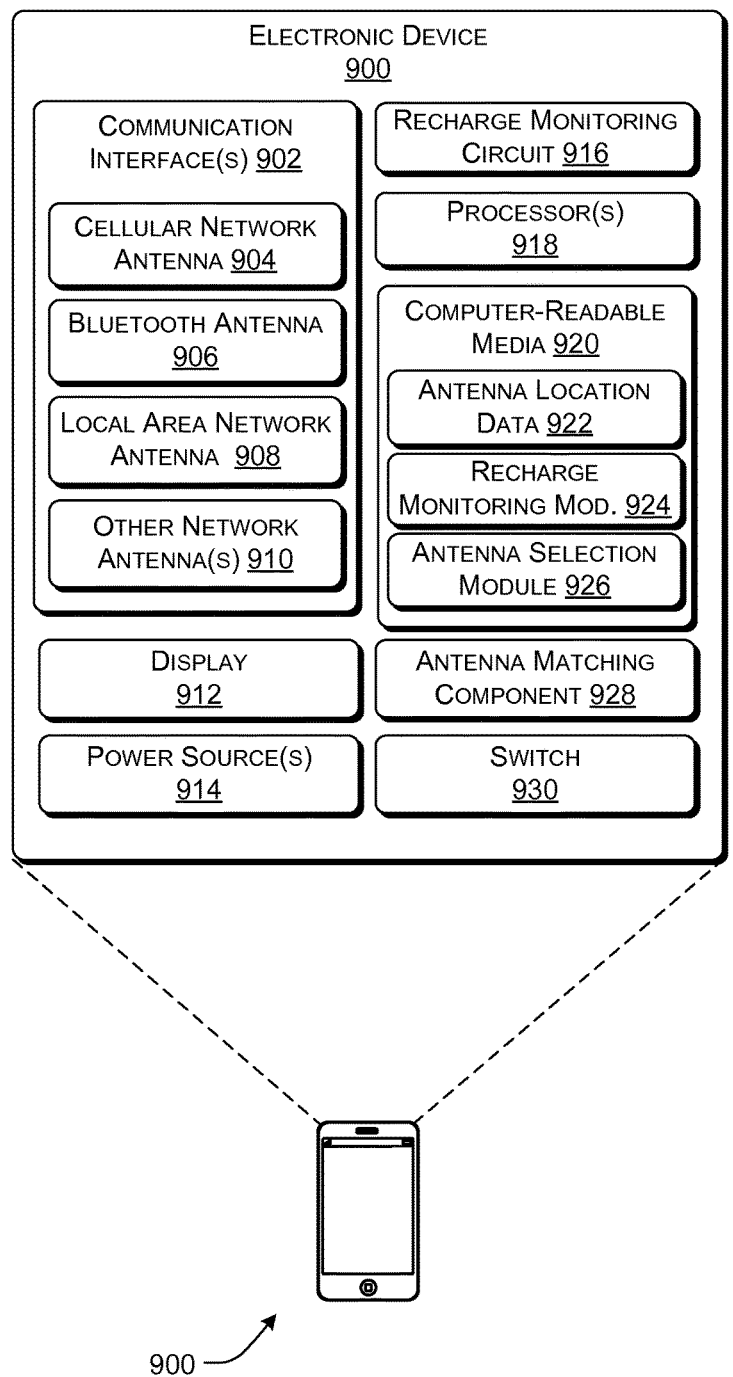
FIG. 9 illustrates an example electronic device according to some implementations.

FIG. 9 illustrates an example electronic device 900 according to some implementations. The electronic device 900 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). In general, the device 900 may be placed on or within a charging station described above to facilitate a power transfer via one or more communication interface 902 associated with normal operation of the device 900. In this manner, the device 900 may be configured for wireless charging without requiring additional hardware dedicated to power transfer, thereby enabling a smaller, lighter, thinner, and cheaper device 900.

In the illustrated example, the communication interface 902 include cellular network antenna 904, Bluetooth® antenna 906, local area network antenna 908, as well as other types of network antennas 910. In general, the communication interfaces 902 facilitate communication between one or more networks, one or more cloud services one or more wireless access points, a master device, and/or one or more other computing devices as part of a network system. The communication interfaces 902 may support various types of wireless connections to various networks, such as cellular networks, radio, Wi-Fi networks, short-range or near-field networks, infrared signals, local area networks, wide area networks, the Internet, and so forth. In the illustrated example, the communication interfaces 902 may also facilities power transfer between the device 900 and a charging station.

The electronic device 900 may also include a display 912 to present information and electronic content to a user. The display 912 may be reflective display, emissive display, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays (LCDs), time multiplexed optical shutter displays, light emitting diode (LED) displays, and so forth. When multiple displays are present, these displays may be of the same or different types. For example, one display may be an electrophoretic display while another may be a liquid crystal display. In some cases, the display 912 may be a touch sensitive display capable of receiving user inputs.

The electronic device 900 also includes a power source 914 and a recharge monitoring circuit 916. In general, the power source 914 is configured to provide a power supply to various components of the electronic device 900 while the device 900 is on. In some examples, the power source 914 may be a fixed or removable battery. The recharge monitoring circuit 916 may be coupled to the power source 914 to determine a recharge rate or an effective power transfer rate as the power source 914 is charged. In some cases, the recharge monitoring circuit 916 and the power source 914 may be electrically coupled to one or more of the communication interfaces 902 for receiving a power signal from the charging station via at least one of the antennas 904-910.

In some cases, the electronic device 900 may also include an antenna matching component 928 to adjust a matching index of the receiving antenna to improve the overall effective rate of power transfer. In some cases, the device 900 may also include a switch coupled to the communication interface 902 that may be configure to switch the device 900 between a recharge mode and/or an operating mode. For example, the switch 930 may enable the communication interface 902 to couple the power source 914 in order to effect a recharge of the device 900 when in the recharge mode and to other circuitry of the device 900 when in the operating mode to allow the device 900 to perform normal operations.

The electronic device 900 also includes one or more processors 918 and computer-readable media 920. Depending on the configuration of the electronic device 900, the computer-readable media 920 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 918.

The computer-readable media 920 may be used to store any number of functional components that are executable on the processors 918. Thus, the computer-readable media 920 may include an operating system and a storage database to one or more modules or applications. For instance, in the illustrated example, the computer-readable media 920 may include antenna location data 922, a recharge monitoring module 924, and an antenna selection module 926.

The antenna location data 922 may include the position of the antennas 904-910 with respect to the device 900. In some cases, the antenna location data 922 may be one or more values representation predefined locations on the device 900, such as the top-right hand corner back side of the device 900. In some instance, the antenna location data 922 may include location data associated with shielding and/or locations from which the antennas 904-910 are configured to receive wireless signals. In one particular instance, the one or more values may be numerical values based on limited of predefined locations associated with a device 900, as described above with respect to FIGS. 3 and 4.

The recharge monitoring module 924 may be configured to determine an effective rate of power transfer associated with particular power signals. In some cases, both the recharge monitoring module 924 and recharge monitoring circuit 916 may be used, while in other cases, one of either the recharge monitoring circuit 916 or the recharge monitoring module 924 may be incorporated into the device 900.

The computer-readable media 826 may include an antenna selection module 926 to analyze effective power rate transfer information received from the charging station, the recharge monitor in circuit 916, the recharge monitoring module 924, or a combination thereof and select an antenna associated with the charging station, a power signal, or a time period to optimize the overall effective power transfer rate from the charging station to the power source 914. In some cases, the selected antenna, a power signal, or a time period may be communicated to the charging station.

Figure 10:
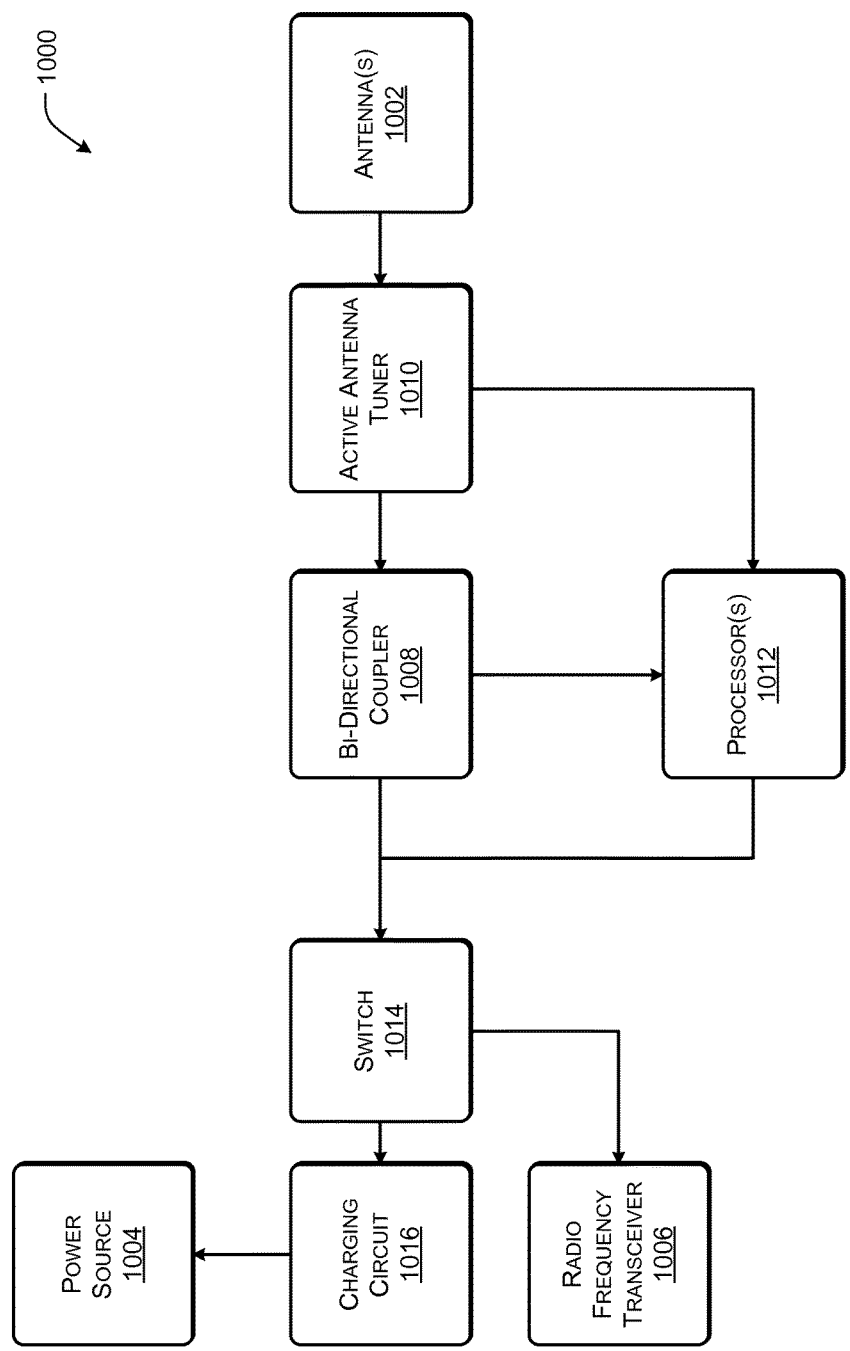
FIG. 10 illustrates an example recharge monitoring circuit according to some implementations.

FIG. 10 illustrates an example recharge monitoring circuit 1000 according to some implementations. In the illustrated example, the recharge monitoring circuit 1000 is coupled between one or more antennas 1002 and a power source 1004 to monitor the effective power transfer rate over a given period of time for a particular frequency. The antennas 1002 are also coupled to a radio frequency transceiver 1006 to perform other operations associated with an electronic device when the device is in an operating mode (such as receiving wireless calls). In general, the recharge monitoring circuit 1000 measures reflected power using a bi-directional coupler 1008 and an active antenna tuner 1010 as a power signal is received at the antenna 1002 and provided to the power source 1004.

In the illustrated example, the bi-directional coupler 1008 receives the power signal and provides a coupled power signal to a circuit or processor 1012. The circuit or processor 1012 together with the bi-directional coupler 1008 and the active antenna tuner 110 may analyze the coupled power signal to determine an effective power transfer rate associated with the currently transmitting antenna and/or an operating frequency. In some cases, the processor 1012 may covert the coupled power signal to a digital signal that may be provided to the charging station to assist the charging station in selecting an appropriate antenna form the array and resonant frequency for transmitting the power signal.

The recharge monitoring circuit 1000 may also include a switch 114 between the bi-directional coupler 1008 and the power source 1004 and the radio frequency transceiver 1006 to switch the device from an operating mode to a recharge mode when the device is place into the charging station. For example, the switch 1014 may route a data signal to the radio frequency transceiver 1006 when the device is in the operating mode and the power signal to a charging circuit 1016 to recharge the power source 1104 when the device is in the recharge mode.

Figure 11:
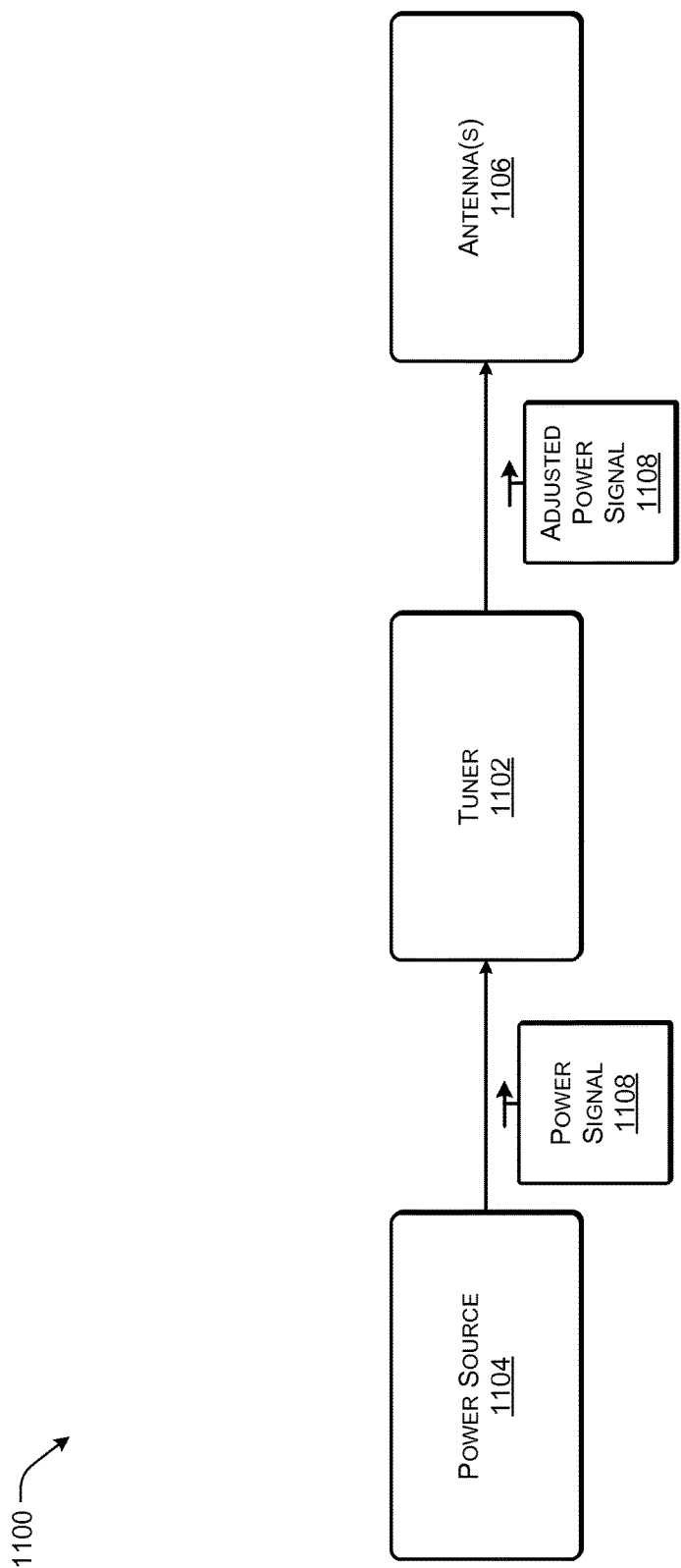
FIG. 11 illustrates an example circuit for selecting a frequency associated with a power signal according to some implementations.

FIG. 11 illustrates an example circuit 1100 for selecting a frequency associated with a power signal according to some implementations. In some cases, the circuit 1100 may be associated with a charging station as described above. The circuit 1100 may include a tuner 1102 coupled between a power source 1104 and an antenna 1106.

In the illustrated example, the power source 1104 generates a power signal 1108. The power signal 1108 is received by the tuner 1102 and modulated. For example, the tuner 1102 may adjust the frequency of the power signal 1108 based on feedback received from a device being recharged. The adjusted power signal 1110 may then be provided to the antenna 1106 for transmission to the device.

Figure 12:
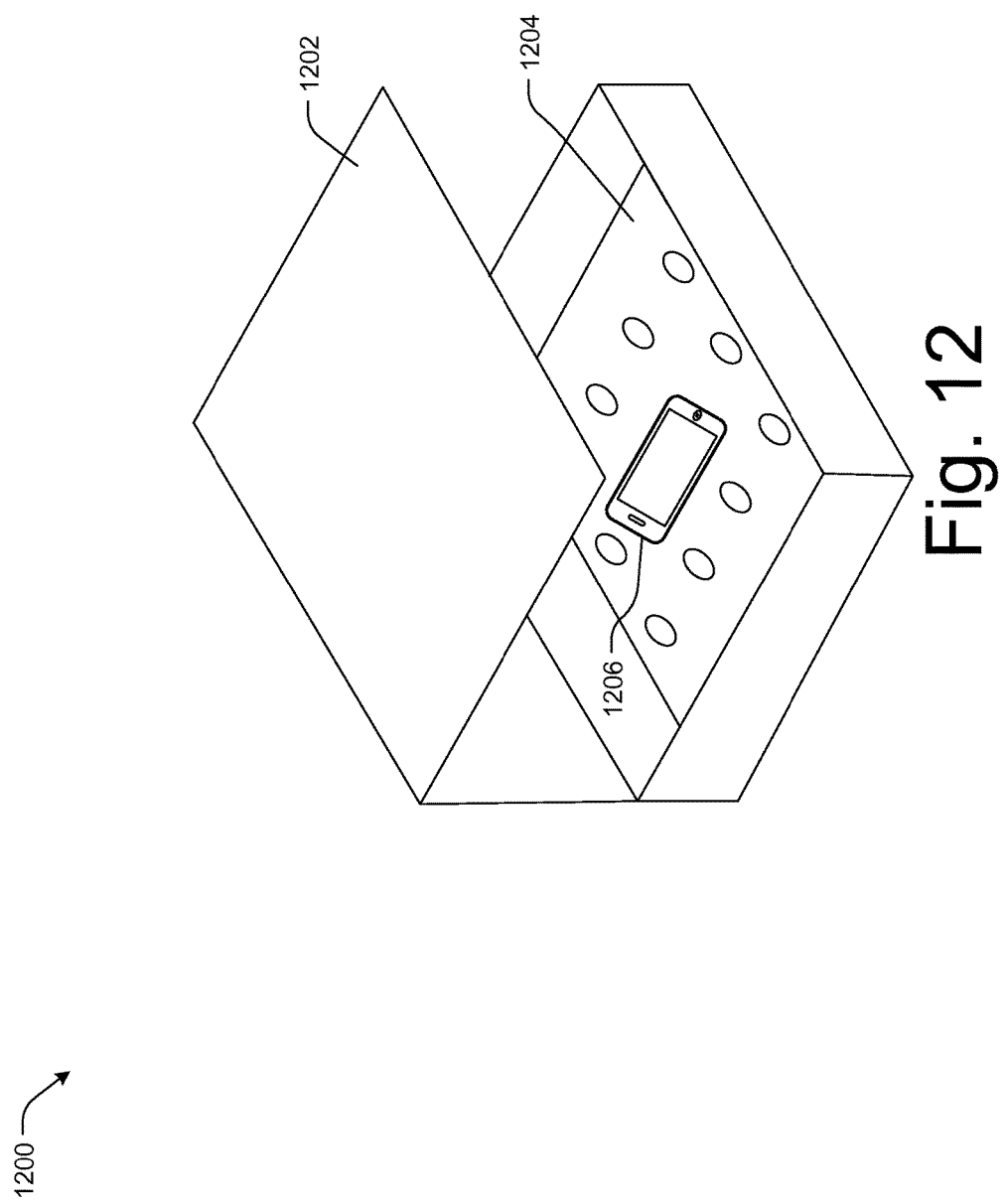
FIG. 12 illustrates another example charging station according to some implementations.

FIG. 12 illustrates another example charging station 1200 according to some implementations. In the illustrated example, the charging station 1200 includes a cantilever 1202 extending out above a charging bed 1204. The cantilever 1202 may include electromagnetic shielding to prevent the radiation or wireless power signal from interfering with other electric devices in the environment while a device 1206 resting on the bed 1204 is recharging. Thus, in some instance, the cantilever 1202 may serve the purpose of the cover 204 of FIG. 2 without requiring a user to open and close the charging station. In these instances, the cantilever 1202 may be equipped with one or more arrays of antennas for providing the power signal as described above with respect to the cover 204 of FIG. 2. In some particular examples, the cantilever 1202 or a cover may be equipped with cleaning lights to sanitize or otherwise remove bacteria from the device 1206, while the device 1206 recharges.

Figure 13:
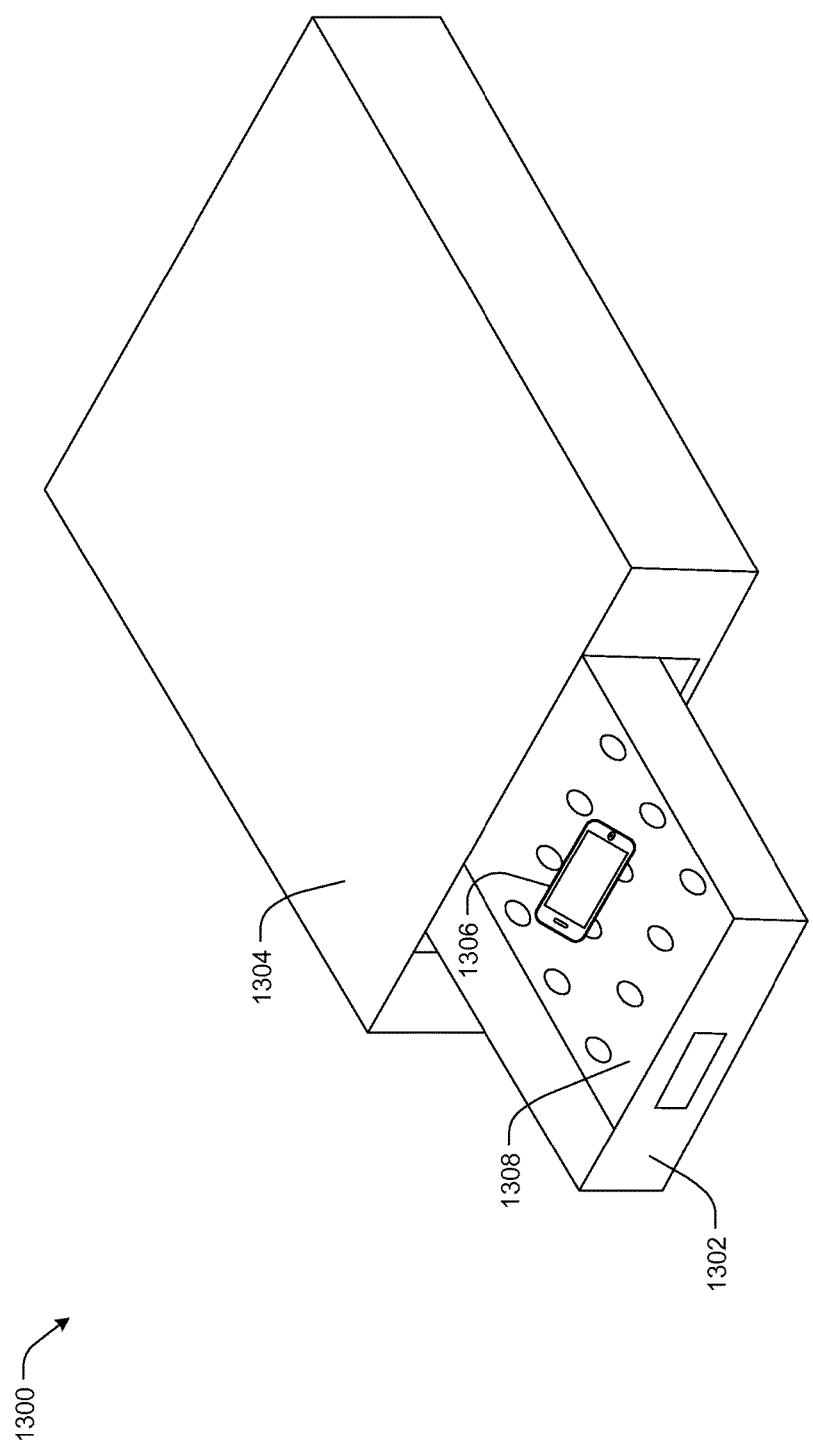
FIG. 13 illustrates another example charging station according to some implementations.

FIG. 13 illustrates another example charging station 1300 according to some implementations. In the illustrated example, the charging station 1300 includes a drawer 1302 that may be removed from a housing 1304 of the charging station 1300 to allow a user to place a device 1306 on a bed 1308 including one or more arrays of antennas. In this example, when the drawer 1302 is closed, the housing 1304 may provide electromagnetic shielding to prevent the radiation or wireless power signal from interfering with other electric devices in the environment while a device 1306 resting on the bed 1308 is recharging.

Figure 14:
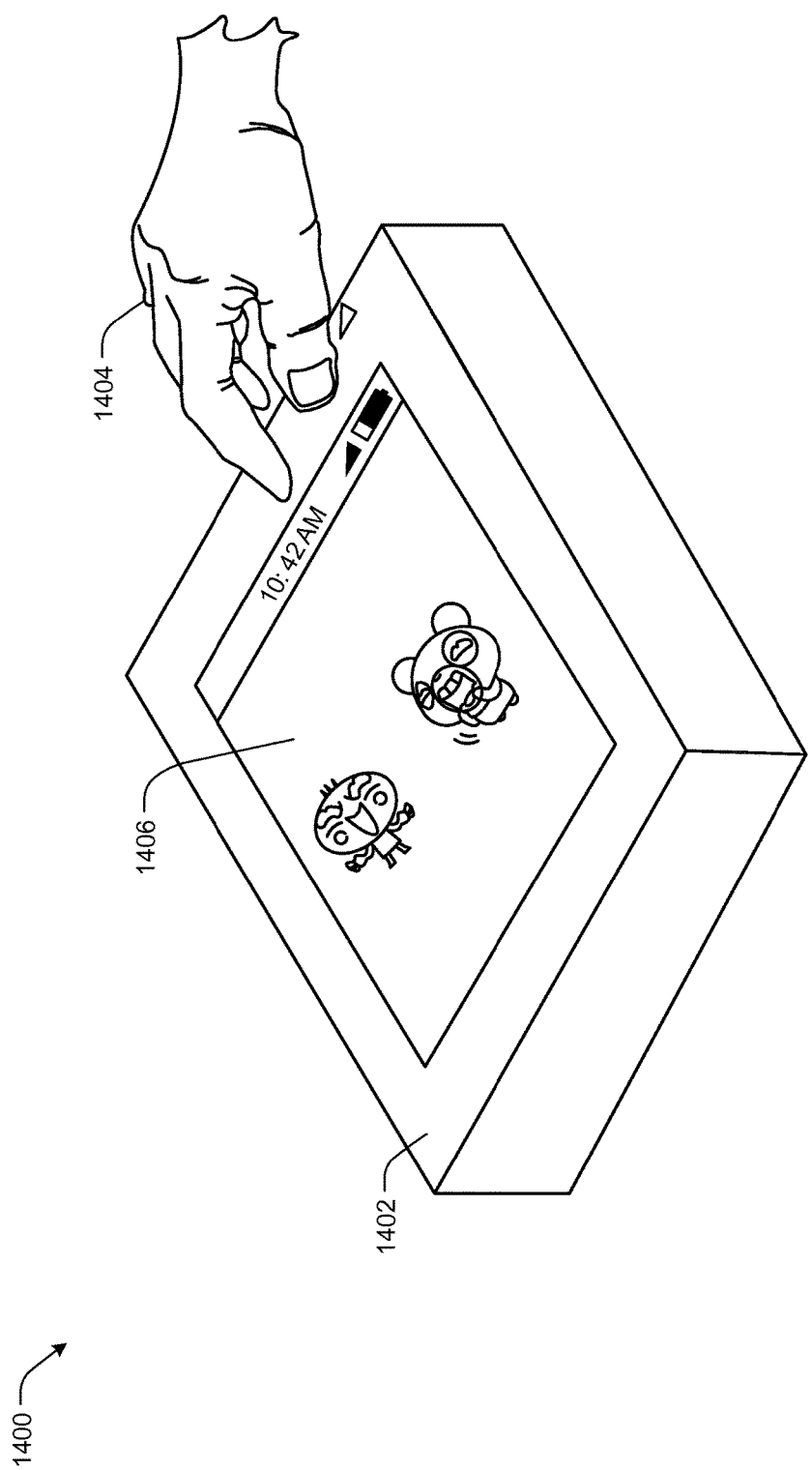
FIG. 14 illustrates another example charging station according to some implementations.

FIG. 14 illustrates another example charging station 1400 according to some implementations. In the illustrated example, the charging station 1400 is shown with a closed cover 1402. In this example, a device may be currently recharging inside the closed charging station 1400, however, a user 1404 may desire to view notification received on the device (e.g., email, text messages, missed calls, etc.) while the device is charging. Thus, in the present example, the charging station 1400 includes a display 1406 for presenting information to a user while a device is being recharged. For example, if the charging station includes a cover (such as is illustrated with respect to FIG. 2), the charging station may also include a display associated with the cover to allow a user to view notification received by the device and/or consume content stored on the device during the recharge cycle. In some specific implementations, the display may be a touch-sensitive display that is capable of both accepting user input and displaying content corresponding to the input.

includes a drawer 1302 that may be removed from a housing 1304 of the charging station 1300 to allow a user to place a device 1306 on a bed 1308 including one or more arrays of antennas. In this example, when the drawer 1302 is closed, the housing 1304 may provide electromagnetic shielding to prevent the radiation or wireless power signal from interfering with other electric devices in the environment while a device 1306 resting on the bed 1308 is recharging.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A charging station comprising:
   a set of antennas arranged in a predefined arrangement, individual antennas of the set of antennas configured to transmit a power signal;
   an image sensor configured to capture an image of a device;
   one or more processors; and
   computer-readable storage media storing computer-executable instructions, which when executed by the one or more processors cause the one or more processors to:
   determine a position of an antenna of the device relative to the set of antennas based at least in part on the image of the device;
   select a first antenna of the set of antennas to provide the power signal to the device; and
   transmit the power signal to the device via the first antenna.

2. The charging station as recited in claim 1, further comprising an additional set of antennas arranged in an additional predefined arrangement.

3. The charging station as recited in claim 1, further comprising:
   a communication interface to communicate with the device; and wherein the position of the antenna of the device is determined by identifying, using the image, a location on the device of a receiving antenna, the location provided by the device via the communication interface.

4. The charging station as recited in claim 1, further comprising a cantilever extending over a housing of the charging station, the cantilever including electromagnetic shielding.

5. The charging station as recited in claim 1, wherein at least the first antenna of the set of antennas is configured to operate at a first antenna operating frequency and at least a second antenna of the set of antennas is configured to operate at a second antenna operating frequency.

6. The charging station as recited in claim 1, wherein the set of antennas are of a first type and the charging station includes an additional set of antennas arranged in an additional predefined arrangement, the additional set of antennas are of a second type.

7. The charging station as recited in claim 1, wherein the computer-executable instructions further cause the one or more processors to:
receive information about an antenna operating frequency from the device; and
wherein the first antenna is configured to operate at the antenna operating frequency.

8. The charging station as recited in claim 1, wherein the computer-executable instructions further cause the one or more processors to:
receive a first value from the device, the first value indicative of a first effective rate of power transfer associated with an original frequency of the power signal;
adjust a frequency at which the first antenna transmits the power signal to the device to produce an adjusted frequency;
receive a second value from the device, the second value indicative of a second effective rate of power transfer, the second effective rate of power transfer associated with the adjusted frequency of the power signal;
determine that the second effective rate of power transfer is greater than the first effective rate of power transfer; and
continue transmitting the power signal at the adjusted frequency.

9. A charging station comprising:
a housing including a charging bed to receive a device;
an array of antennas, individual antennas of the array of antennas configured to transmit a power signal;
one or more sensors for capturing data associated with the device;
one or more processors; and
computer-readable storage media storing computer-executable instructions, which when executed by the one or more processors cause the one or more processors to:
determine a location of a first antenna of the device relative to the array of antennas based at least in part on the data associated with the device;
select a second antenna of the array of antennas to provide the power signal to the device based at least in part on the location of the first antenna;
transmit the power signal to the device via the second antenna; and
monitor a rate of power transfer associated with the second antenna.

10. The charging station as recited in claim 9, further comprising:
a communication interface to communicate with the device; and
wherein the location of the first antenna is further determined at least in part by identifying a location on the device of a receiving antenna, the location of the receiving antenna provided by the device via the communication interface.

11. The charging station as recited in claim 9, wherein at least the second antenna is configured to operate at an antenna operating frequency.

12. The charging station as recited in claim 9, further comprising a cantilever extending over the housing, the cantilever including electromagnetic shielding.

13. The charging station as recited in claim 9, wherein the one or more sensors include one or more image sensors configured to capture an image of the device.

14. A charging station comprising:
a charging bed to receive a device;
a first set of antennas, the first set of antennas located within the charging bed;
a cover located proximate to the charging bed;
a second set of antennas, the second set of antennas located within the cover, and wherein individual antennas of the first set of antennas and the second set of antennas are configured to transmit a power signal;
one or more sensors for capturing data associated with the device;
one or more processors; and
computer-readable storage media storing computer-executable instructions, which when executed by the one or more processors cause the one or more processors to:
determine a location of the device relative to the first set of antennas and the second set of antennas based at least in part on the data associated with the device; and
select an antenna from at least one of the first set of antennas or the second set of antennas to provide the power signal to the device.

15. The charging station as recited in claim 14, wherein the cover includes one or more conductive portions.

16. The charging station as recited in claim 15, wherein the one or more conductive portions are formed from a conductive optically clear material.

17. The charging station as recited in claim 14, further comprising an external antenna exposed to the environment.

18. The charging station as recited in claim 14, wherein the one or more sensors include one or more cameras configured to capture an image of the device.

19. The charging station as recited in claim 14, wherein the computer-executable instructions further cause the one or more processors to identify a type of the device.

20. The charging station as recited in claim 19, wherein the antenna is selected from at least one of the first set of antennas or the second set of antennas to provide the power signal to the device is based at least in part on the location of the device and the type of the device.

* * * * *